United States Patent Office 3,561,948
Patented Feb. 9, 1971

3,561,948
HERBICIDAL COMPOSITIONS CONTAINING CERTAIN SUBSTITUTED IMIDAZOPYRIDINES
Christopher Edward Dealtry, Ulverston, Geoffrey Tattersall Newbold, Saffron Walden, and Albert Percival, Hauxton, England, assignors to Fisons Pest Control Limited, Harston, Cambridgeshire, England
No Drawing. Filed Apr. 8, 1966, Ser. No. 541,103
Claims priority, application Great Britain, Apr. 15, 1965, 16,149/65
Int. Cl. A01n 9/02, 9/22
U.S. Cl. 71—92          14 Claims

ABSTRACT OF THE DISCLOSURE

Substituted imidazopyridines of the type of e.g. 6-chloro-2-trifluoromethylimidazo(4,5-b)pyridine, and their metal salts, ammonium salts, amine salts and N-oxides are valuable herbicides, useful alone or in admixture with known herbicides.

---

The present invention relates to herbicidal compositions containing certain hereinafter-disclosed substituted imidazopyridines.

It has been found that the substituted imidazopyridines as hereinafter described are active in many fields and that these compounds are exceptionally active as herbicides.

Accordingly the present invention is for the substituted imidazopyridines of the formula:

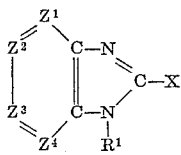

wherein one of the groups $X^1$, $Z^2$, $Z^3$, and $Z^4$ is a nitrogen atom and the other three groups are $CR^2$, $CR^3$ and $CR^4$ respectively, wherein $R^1$ is H, lower alkyl (for example of 1–4 carbon atoms such as methyl, ethyl or butyl), lower aralkyl or substituted aralkyl (for example benzyl or chlorobenzyl), aryl (e.g. phenyl or naphthyl) or substituted aryl (for example chlorophenyl), —$CYZR^5$ or $COR^5$, where Y and Z are O or S and where $R^5$ is alkyl (for example of 1–6 carbon atoms, such as methyl, ethyl, propyl or hexyl), substituted alkyl (for example chloromethyl or bromoethyl), aryl (for example phenyl or naphthyl) or substituted aryl (for example tolyl or xylyl), and wherein $R^2$, $R^3$ and $R^4$ are the same or different and stand for H, alkyl (for example of 1–6 carbon atoms such as methyl, ethyl, propyl or hexyl), hydroxy, lower alkoxy (for example methoxy, ethoxy, butoxy, etc.), substituted alkoxy (e.g. chloromethoxy), aryloxy (for example phenoxy) or substituted aryloxy (for example chlorophenoxy) nitro, halogen (for example chloro, bromo or fluoro), pseudohalogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted or di-substituted carboxy amide, amino or mono- or di-substituted amino (for example methylamino, dimethylamino, acetylamino, trifluoroacetylamino, benzenesulphonamido, paratoluenesulphonamido, methanesulphonamido), thiolo, alkylthiolo, and oxygenated derivatives thereof (for example —$SOR^6$ or —$SO_2R^6$ where $R^6$ is lower alkyl), or —$SO_3H$ and esters and amides thereof and substituted amides (for example phenylsulphamyl, chloroethylsulphamyl) or a heterocyclic ring attached to the imidazopyridine system through a nitrogen atom, and wherein X is trifluoromethyl or pentafluoroethyl, or a salt of functional derivative of said imidazopyridine. According to one embodiment of the invention $Z^4$ is the nitrogen atom.

Salts of the substituted imidazopyridines embraced by the present invention where $R^1$ is hydrogen may comprise ammonium salts, metal salts such as for example sodium, potassium, calcium, zinc, copper and magnesium salts, amine salts such as for example methylamine, ethylamine, dimethylamine, triethylamine, ethanolamine, triethanolamine and benzylamine salts. According to a preferred embodiment the salts are alkali metal salts. Generally the alkali metal salts are crystalline solids, readily soluble in water.

The salts can be prepared by reacting the imidazopyridine in aqueous or aqueous-organic solvent solution or suspension with an alkaline compound of the metal, such as the hydroxide, or with the amine, as appropriate. The metal salts can also be prepared by metathesis for example between the alkali metal salt of the imidazopyridine and a salt of the metal. Some of the imidazopyridines are also basic and can form salts with strong acids such as hydrochloric acid.

The imidazopyridines also form quaternary ammonium salts, which are also embraced by the present invention.

Functional derivatives of the substituted imidazopyridines which may be mentioned include the N-oxides.

A preferred embodiment of the invention is for imidazopyridines of the formula:

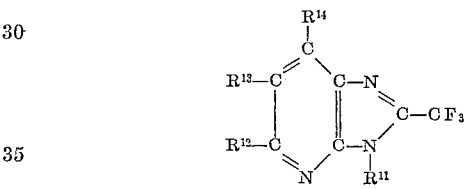

where $R^{11}$ is H or —$COOR^{15}$ (where $R^{15}$ is alkyl for example of 1–6 carbon atoms such as methyl or ethyl, etc., or phenyl) and $R^{12}$, $R^{13}$ and $R^{14}$ are H, alkyl (for example of 1–6 carbon atoms such as methyl, ethyl or butyl) or halogen (for example chlorine, bromine or fluorine).

According to a specially preferred embodiment of the invention the imidazopyridine is 6-chloro-2-trifluoromethylimidazo(4,5-b)pyridine or 1(3)-phenoxycarbonyl-6-chloro-2-trifluoromethylimidazo(4,5-b)pyridine or 1(3)-phenoxycarbonyl-6-chloro-2-trifluoromethylimidazo(4,5-b)pyridine.

The present invention is also for a physiologically active composition and particularly a herbicidal composition which contains as an active component a substituted imidazopyridine as identified above. The physiologically active composition suitably also contains at least one carrier, wetting agent, inert diluent or solvent.

The present invention is also for the treatment of plants, the soil, land or aquatic areas, or materials, which comprises applying thereon or thereto a physiologically active composition as identified above. The compounds and compositions according to the present invention are suitable for controlling detrimental organisms.

The substituted imidazopyridines according to the present invention generally possess physiological activity. These compounds are useful mainly as herbicides, but they also find use as insecticides, molluscicides or fungicides. Some of the compounds thus show activity against houseflies, mosquitoes and spider mites.

The substituted imidazopyridines have been found to be of particular value as selective herbicides for pre-emergence use and are also useful for post-emergence use. With some crops, pre-emergence use is of greater importance. The compounds can also be used as total weedkillers.

The substituted imidazopyridines according to the present invention can be prepared by reacting a 2,3-diaminopyridine or 3,4-diminopyridine with trifluoroacetic acid or pentafluoropropionic acid or their functional derivatives such as the acid chlorides or the amides.

This reaction is represented by the following reaction scheme (for convenience shown for trifluoroacetic acid):

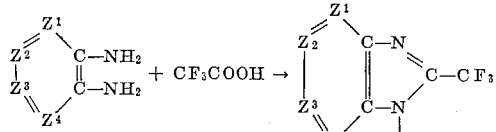

Alternatively, a salt of the diamine of the formula

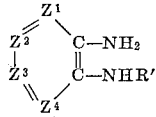

is reacted with a trihalogenoacetic acid or a functional derivative thereof, in a medium of an inorganic acid halide. The inorganic halide may be any liquid inorganic halide such as phosphorus oxychloride, phosphorus trichloride, thionyl chloride and the like. It is preferred to use phosphorus oxychloride. Suitably the reactants are refluxed together. Where the product is a trichloromethyl derivative, this is readily converted into the corresponding trifluoromethyl derivative by treatment with a metal fluoride such as antimony fluoride.

The substituted imidazopyridines according to the present invention wherein $R^1$ is the group —$COOR^5$ can be prepared by reacting the corresponding compound wherein $R^1$ is H with a chloroformate $R^5OCOCl$, in the presence of a base, such as triethylamine. Alternatively these substituted imidazopyridines can be prepared by reacting an alkali metal salt of the corresponding imidazopyridine derivative with a chloroformate.

In the case where one of the groups $R^2$, $R^3$ or $R^4$ is carboxy, the compound can conveniently be prepared by oxidation of the corresponding compound where $R^2$, $R^3$ or $R^4$ is methyl, by oxidation fro example with potassium permanganate.

Many of the salts of the substituted imidazopyridines embraced by the invention are water-soluble, and these may be used in physiologically active compositions, e.g. herbicidal compositions, as aqueous solutions with or without wetting or dispersing agents, organic solvents, stickers and the like, which are commonly incorporated in sprays for agricultural and related purposes. However, it is generally preferred to use the salts of the substituted imidazopyridines in association with a wetting agent.

If desired the substituted imidazopyridines or salts thereof may be dissolved in a water immiscible solvent, such as for example a high boiling hydrocarbon, suitably containing dissolved emulsifying agents so as to act as a self-emulsifiable oil on addition to water.

The substituted imidazopyridines or salts thereof may also be admixed with a wetting agent with or without an inert diluent to form a wettable powder which is soluble or dispersible in water, or may be mixed with the inert diluent to form a solid or powdery product.

Inert diluents with which the substituted imidazopyridines and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, octadecyl sodium sulphate and cetyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The physiologically active compositions according to the present invention may contain in addition to the substituted imidazopyridines or salts thereof, other physiologically active materials such as herbicides, insecticides, fungicides and molluscicides. It has been found that particular advantages are obtained with mixtures with other herbicides.

Accordingly, a further embodiment of the present invention is for a herbicidal composition which comprises a mixture of the substituted imidazopyridine as identified above and a second herbicide.

The second herbicide may be for example a phenoxyaliphatic acid, or a substituted urea or a triazine. In respect of selective herbicidal compositions for post-emergence use, the second herbicide is suitably a substituted phenoxyaliphatic acid; in respect of selective herbicidal compositions for pre-emergence use, the second herbicide is suitably a substituted urea or triazine.

In such mixtures, the phenoxyaliphatic acid generally is an alkyl and/or halogen substituted phenoxyaliphatic acid, or a salt thereof, for example alkali metal, amine and alkanolamine salt, or a functional derivative, for example an ester or amide. These compounds may be of activity such that they are recognized as commercial herbicides, or may be of only slight herbicidal activity. Examples of the substituted phenoxyaliphatic acids which may be mentioned include 2,4-dichlorophenoxyacetic acid; 2-methyl-4-chlorophenoxyacetic acid; 2,4,5-trichlorophenoxyacetic acid; gamma-2,4-dichlorophenoxy-butyric acid; gamma-2-methyl-4-chlorophenoxy-butyric acid; alpha-2-methyl-4-chlorophenoxypropionic acid; etc.

In such mixtures, the substituted urea generally is a tri- or tetra-substituted urea such as N'-parachlorophenyl-N,N'-dimethylurea, N-butyl-N'-(3,4-dichlorophenyl)-N-methylurea, N'-parachlorophenyl-O,N,N-trimethylisourea, N'-p-chlorophenyl-N - methoxy-N-methylurea, N,N-dimethyl-N'-phenylurea, etc.

In such mixtures, the triazine herbicide generally is a compound of the formula:

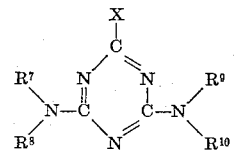

where X is a halogen, OY group or SY group, where Y is lower alkyl, and $R^7$, $R^8$, $R^9$ and $R^{10}$ are H or lower alkyl; e.g. 2-chloro-4,6-bisethylamino-1,3,5-triazine or 2-chloro-6-ethylamino-4-isopropylamino-1,3,5-triazine.

A further embodiment of the invention is a method for the control of weeds, which comprises the use of a mixture of a substituted imidazopyridine and a second herbicide.

The ratio of the substituted imidazopyridine to the second herbicide may vary over a wide range according to the particular compounds involved and the intended use. In general the ratio of substituted imidazopyridine to second herbicide lies in the range 1:0.1 to 1:15 by weight.

These mixtures are of particular value in the control of weeds, and may be more effective and economical than the components used alone.

The following examples are given to illustrate the present invention. Parts and percentages are by weight unless otherwise indicated.

EXAMPLE 1

A solution of 2,3-diaminopyridine (10 parts) in trifluoroacetic acid (50 parts) was refluxed for six hours, cooled and poured into iced water and sufficient alkali added to precipitate a brown solid. The solid was filtered off and dried, then heated above its melting point of 150° C. for 15 minutes, after which resolidification took place. The product was washed with water and dried to yield 2-trifluoromethylimidazo(4,5-b)pyridine (4.9 parts) as a white crystalline solid subliming at 245° C.

Analysis.—$C_7H_4F_3N_3$ requires (percent): C, 44.93; H, 2.16; N, 22.46. Found (percent): C, 44.78; H, 2.45; N, 22.21.

Using analogous methods to that described in Example 1, the following imidazo(4,5-b)pyridines were prepared:

EXAMPLE 2

6-chloro - 2 - trifluoromethylimidazo(4,5-b)pyridine, white crystalline solid, M.P. 304–305° C.

EXAMPLE 3

6-bromo - 2 - trifluoromethylimidazo(4,5-b)pyridine, buff colored solid, M.P. 306–308° C.

EXAMPLE 4

6 - bromo - 5 - methyl-2-trifluoromethylimidazo(4,5-b)pyridine, pale orange solid, subliming at 260° C.

EXAMPLE 5

6 - bromo - 5 - methyl-2-trifluoromethylimidazo(4,5-b)pyridine, white solid, M.P. 232° C.

EXAMPLE 6

7-methyl - 2 - trifluoromethylimidazo(4,5-b)pyridine, cream colored crystals, M.P. 226–228° C.

EXAMPLE 7

6-nitro - 2 - trifluoromethylimidazo(4,5-b)pyridine, cream colored crystals, M.P. 256–258° C.

EXAMPLE 8

6-bromo - 7 - methyl-2-trifluoromethylimidazo(4,5-b)pyridine, colorless needles, M.P. 243–244° C.

EXAMPLE 9

6-bromo - 5,7 - dimethyl-2-trifluoromethylimidazo(4,5-b)pyridine, white needles, M.P. 212–213° C.

EXAMPLE 10

7-methyl - 6 - nitro - 2 - trifluoromethylimidazo(4,5-b)pyridine, yellow needles, M.P. 179–182° C.

EXAMPLE 11

1(3) - (2,3 - dichlorophenyl) - 6-nitro-2-trifluoroimidazo(4,5-b)pyridine, cream plates, M.P. 171–172° C.

EXAMPLE 12

A solution of 3,4-diamino-5-nitropyridine (5.0 parts) in trifluoroacetic acid (38 parts) was refluxed for 16 hours. The mixture was then cooled and excess acid was removed by vacuum distillation. The oily residue was then dissolved in water and partially neutralized with alkali. A pale yellow precipitate formed which was filtered off, recrystallized from water, dried at 80° C. for 6 hours to remove water of crystallization, forming 3.2 parts of 7 - nitro - 2 - trifluoromethylimidazo(4,5-c)pyridine, M.P. 177–179° C.

Analysis.—$C_7H_3F_3N_4O_2$ requires (percent): C, 35.95; H, 1.50; N, 24.10. Found (percent): C, 36.22; H, 1.30; N, 24.12.

EXAMPLE 13

To a solution of 6-bromo-5-methyl-2-trifluoromethylimidazo(4,5-b)pyridine (4.0 parts) and potassium carbonate (2.0 parts) in dry acetone (40 parts) was added with stirring a solution of ethyl chloroformate (1.55 parts) in dry acetone (12 parts). The solution was left to stand for two hours, filtered and the solvent removed under vacuum to give an orange crystalline solid. Recrystallization from 40/60° petroleum ether gave 6-bromo-1(3)-ethoxycarbonyl-5-methyl-2-trifluoromethylimidazo(4,5-b)pyridine (3.7 parts, 74% yield), M.P. 65–70° C.

Analysis.—$C_{11}H_9BrF_3N_3O_2$ requires (percent): C, 37.52; H, 2.58; Br, 22.70; N, 11.93. Found (percent): C, 37.75; H, 2.70; Br, 22.85; N, 11.85.

Using analogous methods to that described in Example 13, the following 1(3)-carboxy derivatives of imidazo(4,5-b)pyridine were prepared:

EXAMPLE 14

6 - chloro - 1(3) - ethoxycarbonyl - 2 - trifluoromethylimidazo(4,5-b)-pyridine, pale yellow crystals, M.P. 123–124° C.

EXAMPLE 15

6 - chloro - 1(3) - phenoxycarbonyl - 2 - trifluoromethylimidazo(4,5-b)-pyridine, pale red crystals, M.P. 83–84° C.

EXAMPLE 16

6 - bromo - 1(3) - ethoxycarbonyl - 2 - trifluoromethylimidazo(4,5-b)-pyridine, brown crystals, M.P. 163° C.

EXAMPLE 17

6 - bromo - 1(3) - phenoxycarbonyl - 2 - trifluoromethylimidazo(4,5-b)-pyridine, M.P. 87° C.

EXAMPLE 18

6 - chloro - 1(3) - isopropoxycarbonyl - 2 - trifluoromethylimidazo - (4,5 - b)pyridine, white solid, M.P. 72–73° C.

EXAMPLE 19

5 - chloro - 6 - methyl - 1(3) - isopropoxycarbonyl-2-trifluoromethylimidazo(4,5-b)pyridine, white needles, M.P. 98–99° C.

EXAMPLE 20

6 - chloro - 1(3) - (2' - chloroethoxycarbonyl) - 2 - trifluoromethylimidazo(4,5 - b)pyridine, colorless needles, M.P. 114–116° C.

EXAMPLE 21

To a hot solution of 6 - bromo - 5 - methyl-2-trifluoromethylimidazo(4,5-b)pyridine (10 parts) and sodium carbonate (7.5 parts) in water (400 parts) was added gradually potassium permanganate (14 parts). The resulting solution was boiled under reflux for two hours, cooled and filtered. The filtrate was evaporated to one-third of its volume and acidified to precipitate 6-bromo-5-carboxy-2-trifluoromethylimidazo(4,5 - b) - pyridine as a fine white solid. This was filtered off, dried and recrystallized to yield 7.1 parts (63%) of pure 6-bromo-5-carboxy-2-trifluoromethylimidazo(4,5-b)pyridine, which sublimed at 265° C.

EXAMPLE 22

Mustard, linseed, buckwheat and sugarbeet were grown in John Innes No. 1 potting compost in aluminum pans (7½ in. x 3¾ in. area x 2 in. depth—19 x 9.5 x 5 cm.). When the plants had between two and five true leaves they were sprayed with aqueous suspension of each of the compounds identified below at rates corresponding to 10, 5, 2½, and 1¼ pounds per acre (11.2, 5.6, 2.8 and 1.4 kilograms per hectare) of active ingredient in 80 gallons (363 liters) of suspension. The suspension contained 0.5% of wetting agent (e.g. sodium oleyl-p-anisidine sulfonate, a commercially available Lissapol type wetting agent). After seven days in a controlled environment room at 22° C. with 14 hours per day illumination of 800 ft. candles (8608 lux) and a relative humidity of 75–90%, the plants were assessed visually for any herbicidal effect. The results are tabulated below; 100 indicates complete destruction of the plant, 0 indicates no herbicidal effect.

| Compound | Rate | | Herbicidal effect | | | |
|---|---|---|---|---|---|---|
| | Lbs./acre | Kg./hectare | Mustard | Linseed | Buckwheat | Sugarbeet |
| 6-chloro-2-trifluoromethylimidazo(4,5-b)pyridine | 10 | 11.2 | 100 | 100 | 100 | 100 |
| | 5 | 5.6 | 100 | 100 | 100 | 100 |
| | 2½ | 2.8 | 100 | 100 | 100 | 100 |
| | 1¼ | 1.4 | 98 | 100 | 100 | 100 |
| 6-bromo-1(3)-ethoxycarbonyl-5-methyl-2-trifluoromethylimidazo(4,5-b)pyridine | 10 | 11.2 | 100 | 100 | 100 | 100 |
| | 5 | 5.6 | 95 | 98 | 100 | 100 |
| | 2½ | 2.8 | 45 | 25 | 100 | 100 |
| 6-bromo-5-methyl-2-trifluoromethylimidazo(4,5-b)pyridine | 10 | 11.2 | 100 | 100 | 100 | 100 |
| | 5 | 5.6 | 100 | 100 | 100 | 100 |
| | 2½ | 2.8 | 98 | 95 | 98 | 100 |
| 6-bromo-2-trifluoromethylimidazo(4,5-b)pyridine | 2½ | 2.8 | 100 | 100 | 100 | 98 |
| | 1¼ | 1.4 | 100 | 100 | 100 | 100 |
| 6-nitro-2-trifluoromethylimidazo(4,5-b)pyridine | 2½ | 2.8 | 100 | 100 | | 100 |
| | 1¼ | 1.4 | 100 | 100 | | 100 |
| 6-bromo-7-methyl-2-trifluoromethylimidazo(4,5-b)pyridine | 2½ | 2.8 | 100 | 100 | | 100 |
| | 1¼ | 1.4 | 100 | 100 | | 100 |
| 6-chloro-1(3)-isopropoxycarbonyl-2-trifluoromethylimidazo(4,5-b)pyridine | 2½ | 2.8 | 100 | 100 | 91 | 100 |
| | 1¼ | 1.4 | 100 | 100 | 80 | 100 |
| 6-chloro-1(3)-phenoxycarbonyl-2-trifluoromethylimidazo(4,5-b)pyridine | 2½ | 2.8 | 100 | 100 | | 100 |
| | 1¼ | 1.4 | 99 | 100 | | 100 |

EXAMPLE 23

Pots were sown with seeds of various species, and after 4 days were sprayed with 6-chloro-2-trifluoromethylimidazo(4,5-b)pyridine at various concentrations. All pots were then watered heavily. One month later blind scores were assessed for percentage growth reduction numbers and size combined to give an $LD_{50}$ as pounds per acre (equivalent kg. per 0.9 hectare) of the compound for each species. The results are given in the following table:

Species: $LD_{50}$
- Maize ___ 6
- Soy bean ___ 2.5
- Setaria ___ 0.25
- Blackgrass ___ 0.25
- Mayweed ___ 0.06
- Mustard ___ 0.06
- Chickweed ___ 0.06

EXAMPLE 24

A solution of the sodium salt of 6-chloro-2-trifluoromethylimidazo(4,5-b)pyridine was prepared by mixing 25% weight/volume of 6-chloro-2-trifluoromethylimidazo(4,5-b)pyridine and 4.61% weight/volume of sodium hydroxide and made up to 100 parts with water.

This concentrate was diluted with water and used for pre-emergent spraying in cereal crops. Very satisfactory weed control was obtained.

EXAMPLE 25

A wettable powder formulation was made up as follows:

Parts
- 6-chloro-2-trifluoromethylimidazo(4,5-b)pyridine ___ 25
- 2-chloro-4,6-bis(ethylamino)-1,3,5-triazine ___ 25
- The condensation product of dodecyl alcohol with 4 mols of ethylene oxide (commercially available as Serfal LA-40) ___ 1
- The sodium salt of sulphonated cresol/formaldehyde resin (commercially available as Diapol PT) ___ 5
- China clay ___ 44

This formulation was suspended in water and applied to railway tracks. Total weed control was obtained.

EXAMPLE 26

An aqueous solution was made up which contained 5% of the sodium salt of 6-chloro-2-trifluoromethylimidazo(4,5-b)pyridine and 20% of the sodium salt of 2-methyl-4-chlorophenoxyacetic acid.

This solution was diluted with water and used for post-emergent spraying in cereal crops. Excellent weed control was obtained.

What we claim is:

1. A herbicidal composition which consists essentially of, as active ingredient, an effective quantity of a member selected from the group consisting of substituted imidazopyridines of the formula:

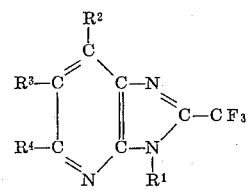

wherein $R^1$ is hydrogen, phenyl, halophenyl, or —$COOR^5$, $R^5$ being lower alkyl or phenyl, and $R^2$, $R^3$ and $R^4$ are the same or different and are selected from the group consisting of hydrogen, lower alkyl, halogen and nitro, and metal salts of said compounds selected from the group consisting of sodium, potassium, calcium, zinc, copper and magnesium salts, ammonium salts formed from non-herbicidal ammonium compounds, amine salts formed by the addition of non-herbicidal amines and N-oxides thereof, and an inert herbicide carrier.

2. A herbicidally active composition as claimed in claim 1 which also contains at least one material selected from the group consisting of wetting agents, inert diluents and inert organic solvents.

3. A herbicidal composition which consists essentially of, as active ingredient, a herbicidally effective amount of a substituted imidazopyridine of the formula

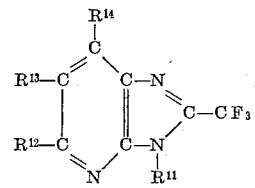

wherein $R^{11}$ is a member selected from the group consisting of H, —COO.lower alkyl and COO.phenyl, and $R^{12}$ $R^{13}$ and $R^{14}$ are the same or different and are selected from the group consisting of H, lower alkyl and halogen; and an inert herbicide carrier.

4. A composition according to claim 1, wherein the active ingredient is 6-chloro-2-trifluoromethylimidazo(4,5-b)pyridine.

5. A method of controlling vegetable growth which consists of post-emergently applying to such growth a herbicidally effective amount of a substituted imidazopyridine as defined in claim 1.

6. A method of controlling vegetable growth which consists of pre-emergently applying to soil where such growth can occur a herbicidally effective amount of a substituted imidazopyridine as defined in claim 1.

7. A method of controlling vegetable growth which consists of applying to said growth a herbicidally effective amount of a substituted imidazopyridine of the formula

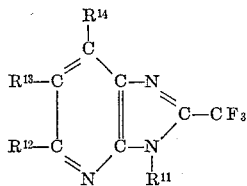

wherein $R^{11}$ is a member selected from the group consisting of H, —COO.lower alkyl and COO.phenyl, and $R^{12}$, $R^{13}$ and $R^{14}$ are the same or different and are selected from the group consisting of H, lower alkyl and halogen.

8. A method according to claim 7, wherein said substituted imidazopyridine is post-emergently applied.

9. A method according to claim 7, wherein said substituted imidazopyridine is pre-emergently applied.

10. A method of controlling vegetable growth which consists in applying thereto a herbicidally effective amount of 6-chloro-2-trifluoromethylimidazo(4,5-b)pyridine.

11. A herbicidal composition which consists essentially of a substituted imidazopyridine as claimed in claim 1 and a second herbicide selected from the group consisting of (A) a phenoxy aliphatic acid compound selected from the group consisting of 2-methyl-4-chlorophenoxyacetic acid, 2,4-dichlorophenoxyacetic acid, 2,4,5-trichlorophenoxyacetic acid, gamma-2-methyl-4-chlorophenoxybutyric acid, gamma-2,4-dichlorophenoxybutyric acid and alpha-2-methyl-4-chlorophenoxypropionic acid, (B) a substituted urea compound selected from the group consisting of N'-parachlorophenyl-N,N'-dimethylurea, N-butyl-N'-(3,4 - dichlorophenyl)-N-methylurea, N'-parachlorophenyl-O,N,N-trimethylisourea, N'-p-chlorophenyl-N-methoxy-2-methylurea, and N,N-dimethyl-N'-phenylurea, and (C) a triazine compound selected from the group consisting of 2-chloro-4,6-bisethylamino-1,3,5-triazine and 2-chloro-6-ethylamino-4-isopropyl-amino-1,3,5-triazine said compounds being present in a herbicidal amount, wherein the ratio of substituted imidazopyridine to second herbicide lies in the range of 1:0.1 to 1:15 by weight.

12. A herbicidal composition as claimed in claim 1 wherein the second herbicide is a phenoxy aliphatic acid selected from the group consisting of 2-methyl-4-chlorophenoxyacetic acid, 2,4-dichlorophenoxyacetic acid, 2,4,5-trichlorophenoxyacetic acid, gamma-2-methyl-4-chlorophenoxyacetic acid, gamma-2,4-dichlorophenoxybutyric acid and alpha-2-methyl-4-chlorophenoxypropionic acid.

13. A herbicidal composition as claimed in claim 1 wherein the second herbicide is a substituted urea compound selected from the group consisting of N'-parachlorophenyl - N,N' - dimethylurea, N-butyl-N'-(3,4-dichlorophenyl)-N-methylurea, N' - parachlorophenyl-O,N,N-trimethylisourea, N'-p-chlorophenyl-N-methoxy-2-methylurea, and N,N-dimethyl-N'-phenylurea.

14. A composition in accordance with claim 11, wherein the second herbicide is a triazine compound selected from the group consisting of 2-chloro-4,6-bisethylamino-1,3,5-triazine and 2-chloro - 6 - ethylamino-4-isopropylamino-1,3,5-triazine.

References Cited

UNITED STATES PATENTS

| | | | |
|---|---|---|---|
| 3,459,759 | 8/1969 | Röchling et al. | 71—94 |
| 3,325,271 | 6/1967 | Goldsmith et al. | 71—92 |
| 3,401,030 | 9/1968 | Berthold et al. | 71—92 |
| 3,250,769 | 5/1966 | Schmidt et al. | 260—296 |
| 3,381,016 | 4/1968 | Markillie | 71—94 |
| 2,390,941 | 12/1945 | Jones | 71—116 |
| 2,637,731 | 5/1953 | Vaughan, Jr. | 260—296 |
| 2,849,306 | 8/1958 | Searle | 71—120 |
| 2,987,518 | 6/1961 | Hoffmann et al. | 260—296 |
| 3,112,342 | 11/1963 | Luckenbaugh | 71—116 |
| 3,151,970 | 10/1964 | Lush et al. | 71—116 |
| 3,190,740 | 6/1965 | Wolter | 71—120 |

OTHER REFERENCES

Fisons Pest Control Ltd. "2-Perfluoroalkylbenzimidazoles," 2(1965) CA 63, pp. 18101–02 (1965).

Fisons, "Substituted Imidazopyridines" (1966) CA 66, 1967.

LEWIS GOTTS, Primary Examiner

G. HOLLRAH, Assistant Examiner

U.S Cl. X.R.

71—93, 116, 117, 120; 260—294.8, 294.9, 295, 296; 424—263